United States Patent
Allen

(10) Patent No.: US 9,571,990 B2
(45) Date of Patent: Feb. 14, 2017

(54) CHAT INTERACTION BETWEEN MOBILE PHONE AND NON-MOBILE PHONE DEVICES

(71) Applicant: International Business Machines Corporation, Armonk, NY (US)

(72) Inventor: Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 13/891,383

(22) Filed: May 10, 2013

(65) Prior Publication Data

US 2014/0335904 A1    Nov. 13, 2014

(51) Int. Cl.
*H04W 4/00*     (2009.01)
*H04W 4/12*     (2009.01)
*H04W 4/02*     (2009.01)

(52) U.S. Cl.
CPC .............. *H04W 4/12* (2013.01); *H04W 4/023* (2013.01)

(58) Field of Classification Search
CPC ........ H04W 4/14; H04W 4/12; H04L 12/5895

USPC ......................................................... 455/466
See application file for complete search history.

(56) References Cited

U.S. PATENT DOCUMENTS

| 8,175,522 | B1 | 5/2012 | Coleman et al. |
| 2007/0275740 | A1* | 11/2007 | Deutsch ................ H04L 12/583 455/466 |
| 2010/0093379 | A1 | 4/2010 | Neely et al. |
| 2010/0304728 | A1 | 12/2010 | Silverbrook et al. |
| 2011/0153750 | A1 | 6/2011 | Sanchez |
| 2012/0246594 | A1* | 9/2012 | Han et al. ..................... 715/790 |
| 2014/0004839 | A1* | 1/2014 | Block et al. .................. 455/417 |

* cited by examiner

*Primary Examiner* — Vladimir Magloire
*Assistant Examiner* — Juan C Perez Tolentino
(74) *Attorney, Agent, or Firm* — Brian J. Colandreo, Esq.; Jeffrey T. Placker, Esq.; Holland & Knight LLP

(57) ABSTRACT

A method, computer program product, and computer system for identifying content on a computing device. A selection of an intended recipient of an electronic message is received. The content is transmitted from the computing device to a first mobile computing device. The content is transmitted from the first mobile computing device to a second mobile computing device via the electronic message.

20 Claims, 7 Drawing Sheets

CHAT INTERACTION BETWEEN MOBILE PHONE AND NON-MOBILE PHONE DEVICES

BACKGROUND

Communication between two or more users may be accomplished using many different mediums. For example, a first user may utilize their PC to communication with a second user by sending, e.g., electronic mail (email) or instant messages, to the second user's PC. Similarly, the first user may utilize their mobile phone to communication with the second user by sending, e.g., electronic "text" messages, to the second user's mobile device. However, it may be more difficult for the first user to utilize their PC for communication with the second user if, for example, the second user is utilizing their mobile device.

BRIEF SUMMARY OF DISCLOSURE

In one implementation, a method, performed by one or more computing devices, comprises identifying content on a computing device. A selection of an intended recipient of an electronic message is received. The content is transmitted from the computing device to a first mobile computing device. The content is transmitted from the first mobile computing device to a second mobile computing device via the electronic message.

One or more of the following features may be included. The first mobile computing device may be registered as a texting agent. The first mobile computing device may be registered based upon, at least in part, proximity to the computing device. Registering may include one or more of pairing the first mobile computing device with the computing device, and sending one or more of a messaging type capability, one or more potential recipients, and one or more active recipients. The content may be automatically transmitted from the first mobile computing device to the second mobile computing device via the electronic message. The content may be manually transmitted from the first mobile computing device to the second mobile computing device via the electronic message. The selection of the intended recipient of the electronic message may be received via a context menu. The electronic message may include a text message.

In another implementation, a computing system includes a processor and a memory configured to perform operations comprising identifying content on a computing device. A selection of an intended recipient of an electronic message is received. The content is transmitted from the computing device to a first mobile computing device. The content is transmitted from the first mobile computing device to a second mobile computing device via the electronic message.

One or more of the following features may be included. The first mobile computing device may be registered as a texting agent. The first mobile computing device may be registered based upon, at least in part, proximity to the computing device. Registering may include one or more of pairing the first mobile computing device with the computing device, and sending one or more of a messaging type capability, one or more potential recipients, and one or more active recipients. The content may be automatically transmitted from the first mobile computing device to the second mobile computing device via the electronic message. The content may be manually transmitted from the first mobile computing device to the second mobile computing device via the electronic message. The selection of the intended recipient of the electronic message may be received via a context menu. The electronic message may include a text message.

In another implementation, a computer program product resides on a computer readable storage medium that has a plurality of instructions stored on it. When executed by a processor, the instructions cause the processor to perform operations comprising identifying content on a computing device. A selection of an intended recipient of an electronic message is received. The content is transmitted from the computing device to a first mobile computing device. The content is transmitted from the first mobile computing device to a second mobile computing device via the electronic message.

One or more of the following features may be included. The first mobile computing device may be registered as a texting agent. The first mobile computing device may be registered based upon, at least in part, proximity to the computing device. Registering may include one or more of pairing the first mobile computing device with the computing device, and sending one or more of a messaging type capability, one or more potential recipients, and one or more active recipients. The content may be automatically transmitted from the first mobile computing device to the second mobile computing device via the electronic message. The content may be manually transmitted from the first mobile computing device to the second mobile computing device via the electronic message. The selection of the intended recipient of the electronic message may be received via a context menu. The electronic message may include a text message.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

System Overview

Figure 1:
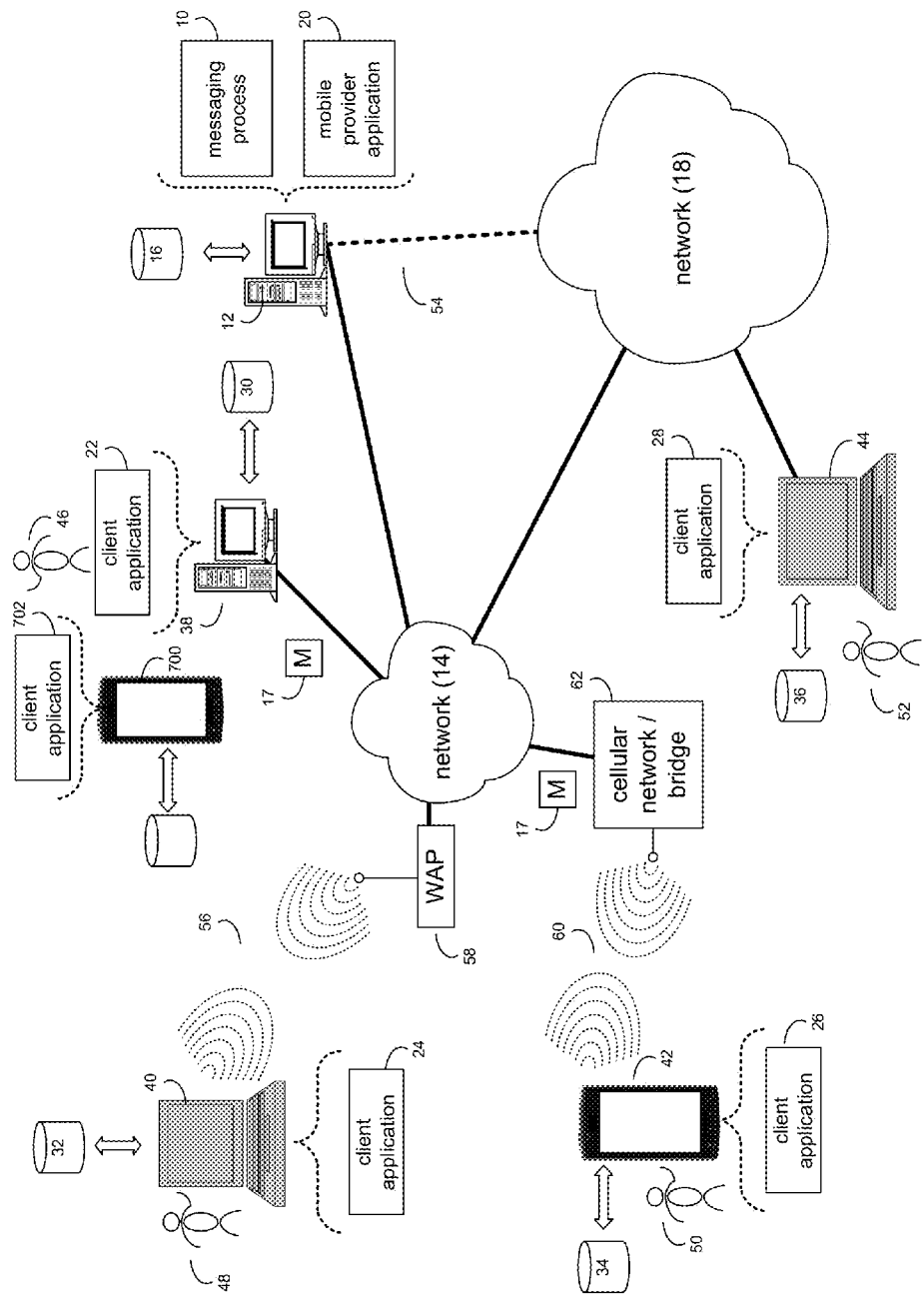
FIG. 1 is an illustrative diagrammatic view of a messaging process coupled to a distributed computing network according to one or more implementations of the present disclosure.

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown messaging process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, messaging process 10 may identify content on a computing device. A selection of an intended recipient of an electronic message (e.g., message 17) may be received. The content may be transmitted from the computing device to a first mobile computing device. The content may be transmitted from the first mobile computing device to a second mobile computing device via the electronic message.

The instruction sets and subroutines of messaging process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Messaging process 10 may be a component of the data store, a stand alone application that interfaces with the above noted data store and/or an applet/application that is accessed via client applications 22, 24, 26, 28, 702. The above noted data store may be, in whole or in part, distributed in a cloud computing topology. In this way, computer 12 and storage device 16 may refer to multiple devices, which may also be distributed throughout the network.

Computer 12 may execute a mobile provider application (e.g., mobile provider application 20), examples of which may include, but are not limited to, e.g., a smart phone application, a data-enabled, cellular telephone application, or other application that enables the communication between two or more client electronic devices. Messaging process 10 and/or mobile provider application 20 may be accessed via client applications 22, 24, 26, 28, 702. Messaging process 10 may be a stand alone application, or may be an applet/application/script that may interact with and/or be executed within mobile provider application 20 and/or one or more of client applications 22, 24, 26, 28, 702. Mobile provider application 20 may be a stand alone application, or may be an applet/application/script that may interact with and/or be executed within messaging process 10 and/or one or more of client applications 22, 24, 26, 28, 702. One or more of client applications 22, 24, 26, 28, 702 may be a stand alone application, or may be an applet/application/script that may interact with and/or be executed within messaging process 10 and/or mobile provider application 20. Examples of client applications 22, 24, 26, 28, 702 may include, but are not limited to, e.g., a smart phone application, a data-enabled, cellular telephone application, or other application that enables the communication between two or more client electronic devices, a standard and/or mobile web browser, an email client application, a textual and/or a graphical user interface, a customized web browser, a plugin, or a custom application. The instruction sets and subroutines of client applications 22, 24, 26, 28, 702, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42, client electronic device 700), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28, 702 may be configured to effectuate some or all of the functionality of messaging process 10 (and vice versa). Accordingly, messaging process 10 may be a purely server-side application, a purely client-side application, or a hybrid server-side/client-side application that is cooperatively executed by one or more of client applications 22, 24, 26, 28, 702 and/or messaging process 10.

One or more of client applications 22, 24, 26, 28, 702 may be configured to effectuate some or all of the functionality of mobile provider application 20 (and vice versa). Accordingly, mobile provider application 20 may be a purely server-side application, a purely client-side application, or a hybrid server-side/client-side application that is cooperatively executed by one or more of client applications 22, 24, 26, 28, 702 and/or mobile provider application 20. As one or more of client applications 22, 24, 26, 28, 702, messaging process 10, and mobile provider application 20, taken singly or in any combination, may effectuate some or all of the same functionality, any description of effectuating such functionality via one or more of client applications 22, 24, 26, 28, 702, messaging process 10, mobile provider application 20, or combination thereof, and any described interaction(s) between one or more of client applications 22, 24, 26, 28, 702, messaging process 10, mobile provider application 20, or combination thereof to effectuate such functionality, should be taken as an example only and not to limit the scope of the disclosure.

Users 46, 48, 50, 52 may access computer 12 and messaging process 10 (e.g., using one or more of client electronic devices 38, 40, 42, 44) directly through network 14 or through secondary network 18. Further, computer 12 may be connected to network 14 through secondary network 18, as illustrated with phantom link line 54. Messaging process 10 may include one or more user interfaces, such as browsers and textual or graphical user interfaces, through which users 46, 48, 50, 52 may access messaging process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection.

Figure 2:
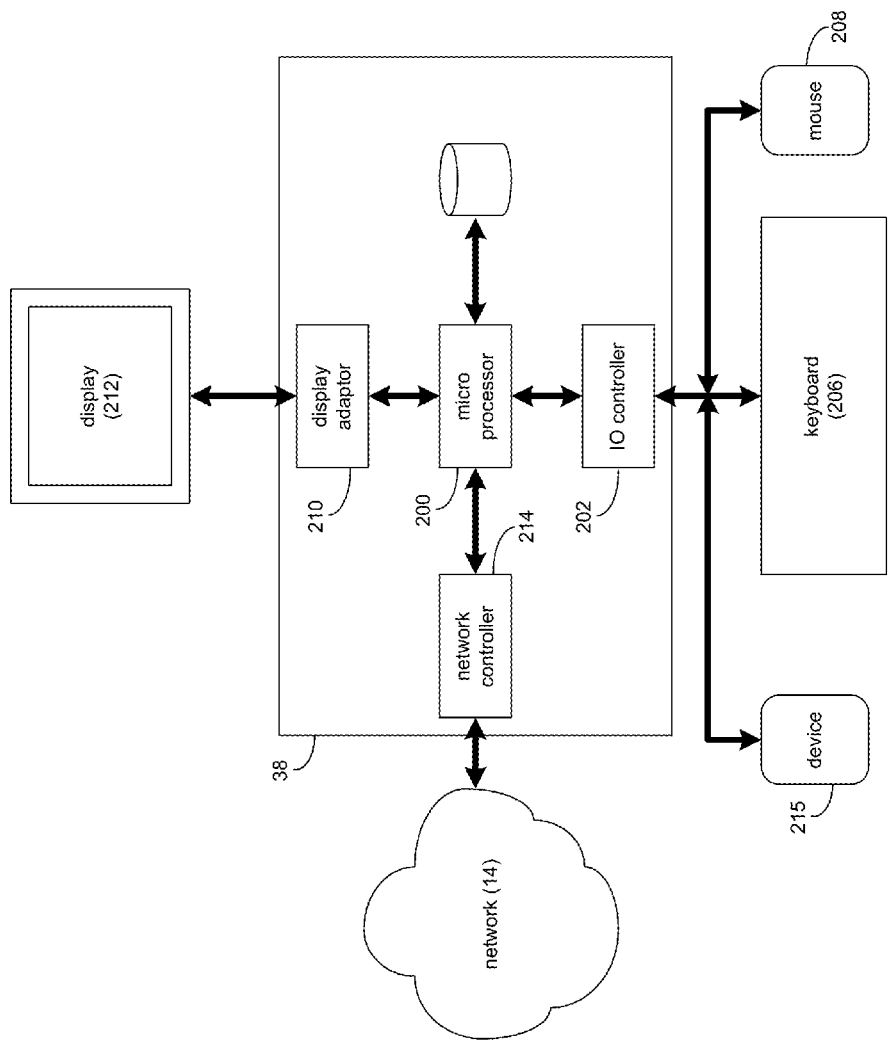
FIG. 2 is a diagrammatic view of a client electronic device of FIG. 1 according to one or more implementations of the present disclosure.
Figure 3:
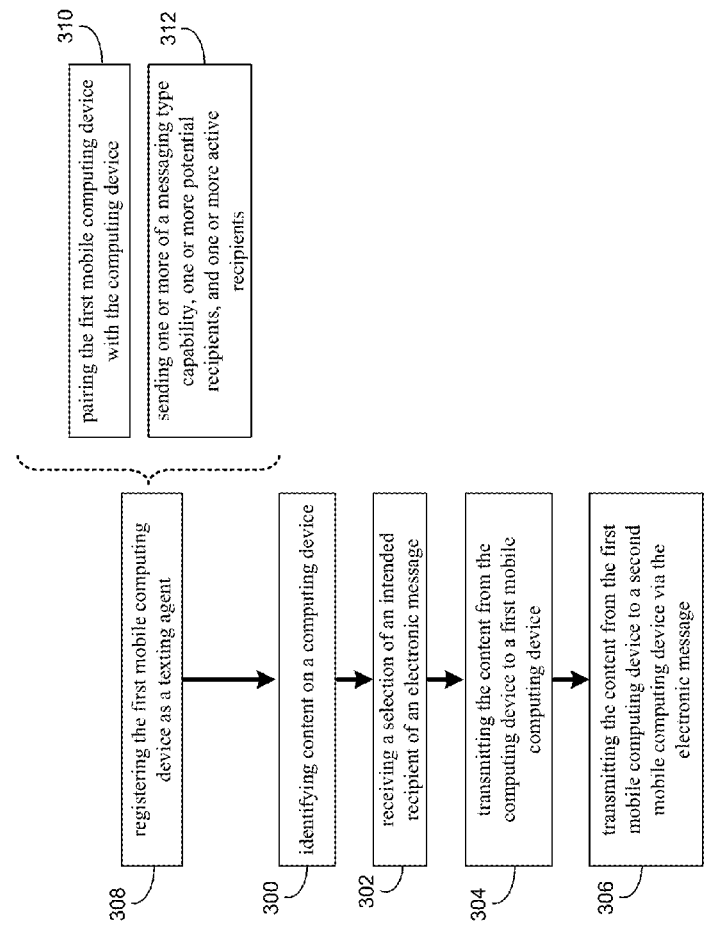
FIG. 3 is an illustrative flowchart of the messaging process of FIG. 1 according to one or more implementations of the present disclosure.
Figure 4:
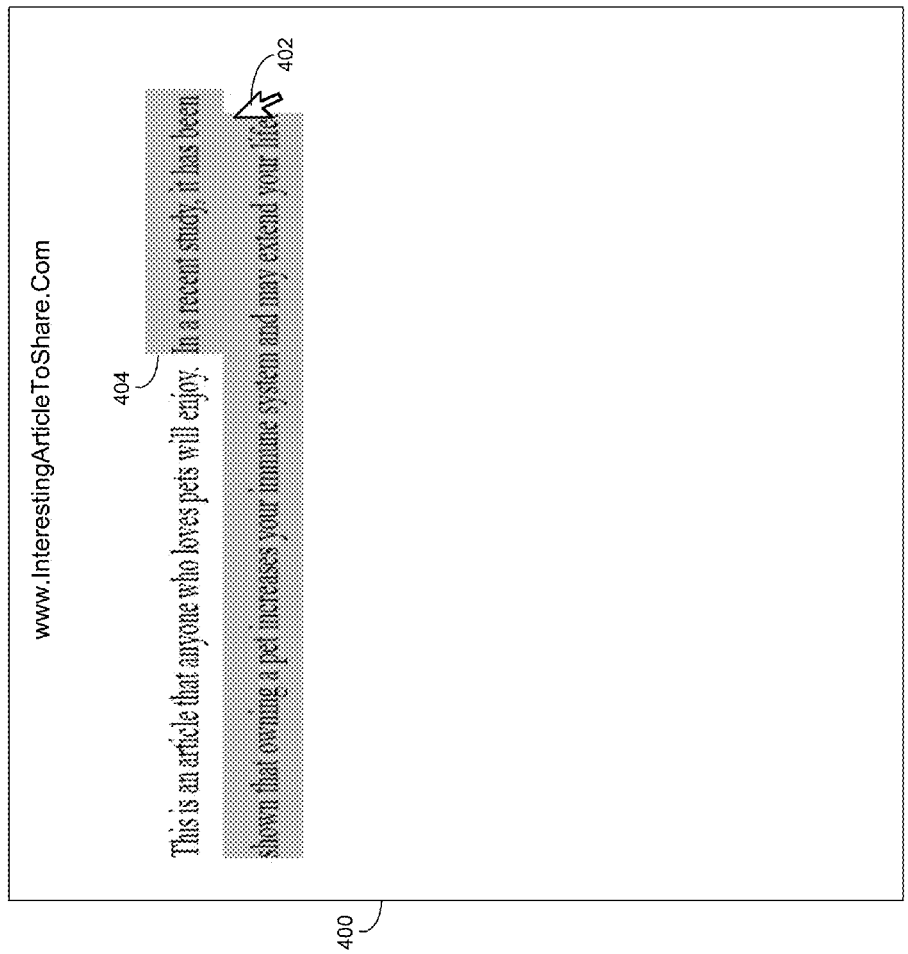
FIG. 4 is an illustrative diagrammatic view of a screen image displayed by the messaging process of FIG. 1 according to one or more implementations of the present disclosure.
Figure 5:
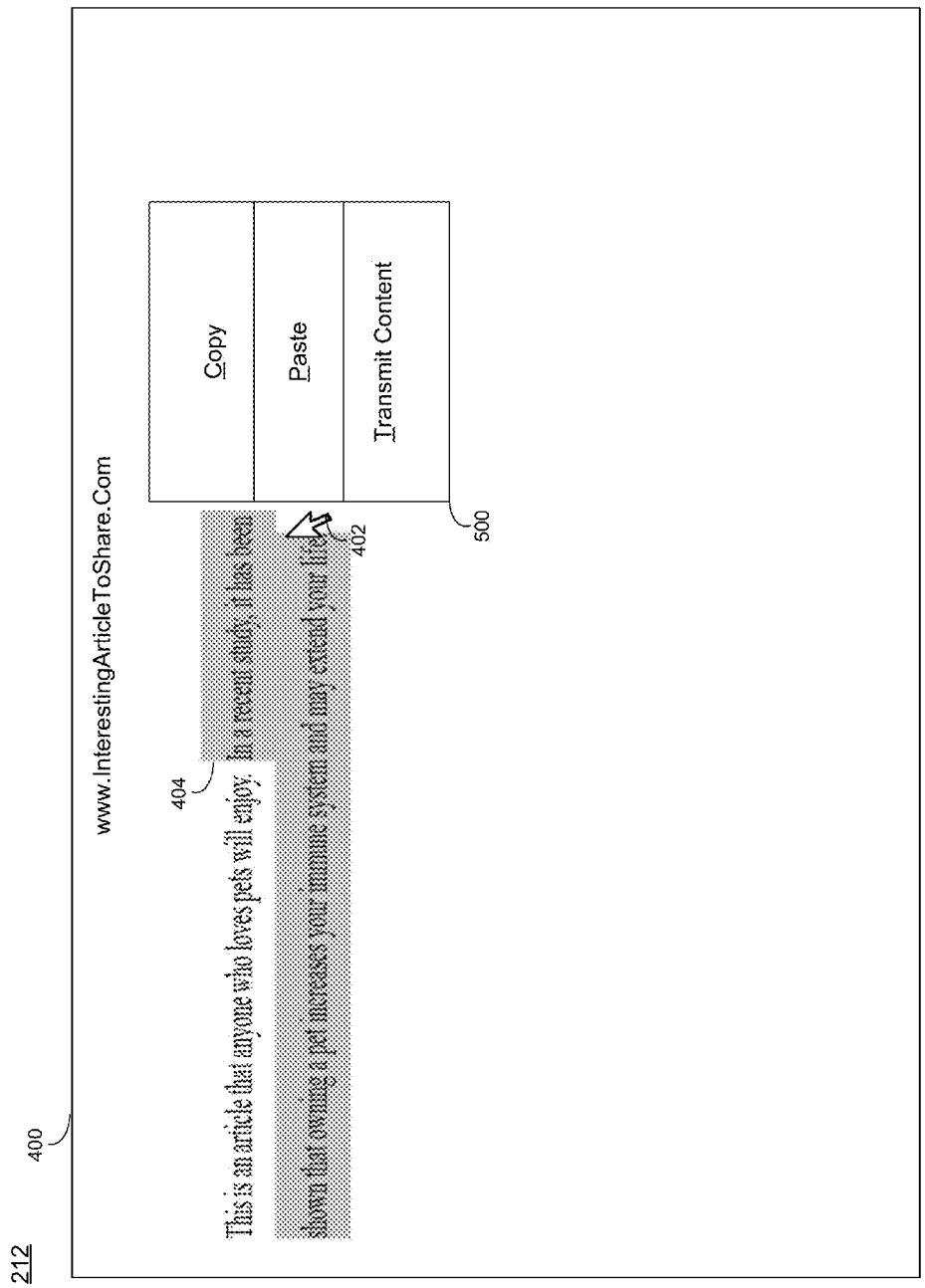
FIG. 5 is an illustrative diagrammatic view of a screen image displayed by the messaging process of FIG. 1 according to one or more implementations of the present disclosure.
Figure 6:
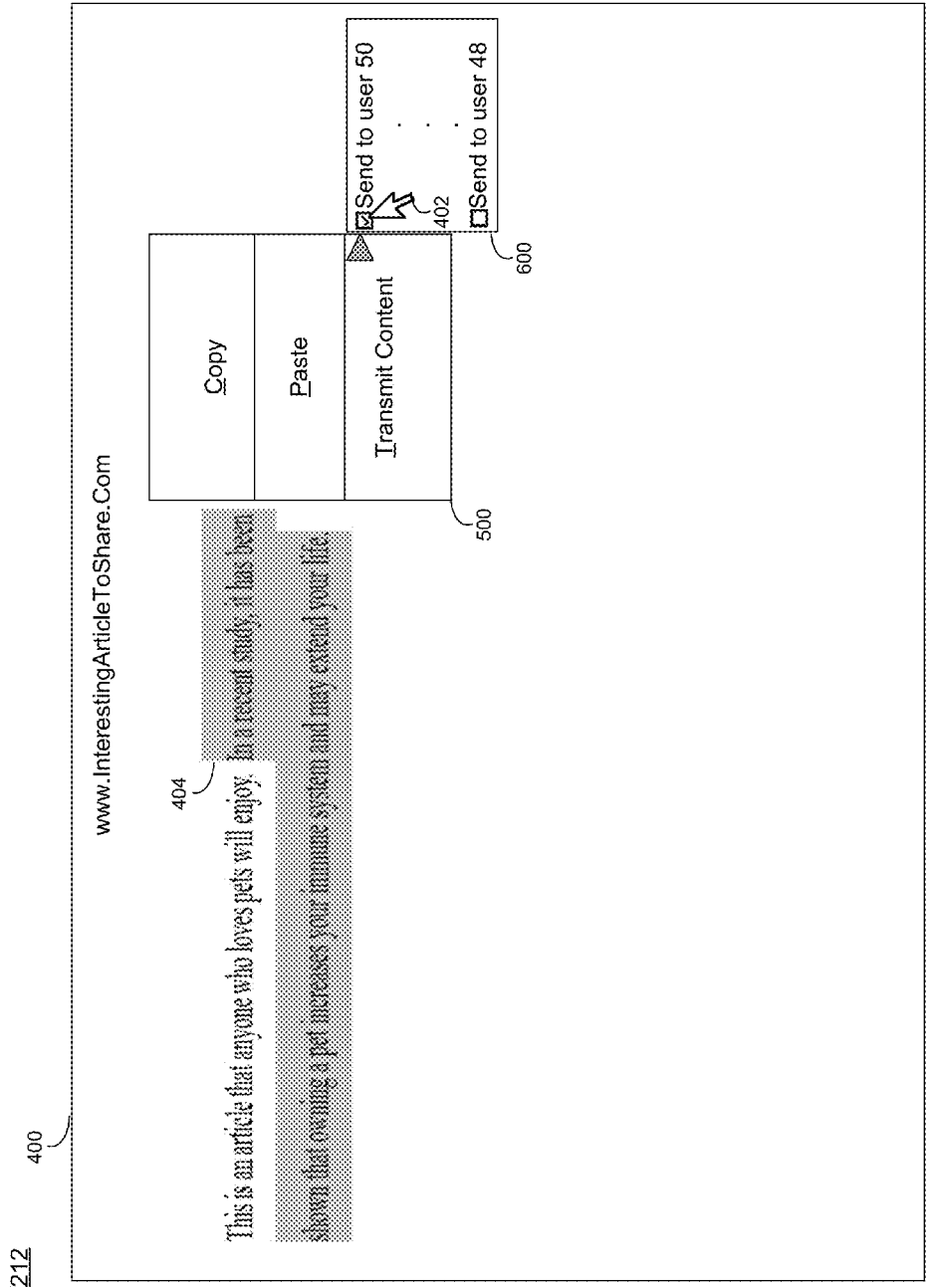
FIG. 6 is an illustrative diagrammatic view of a screen image displayed by the messaging process of FIG. 1 according to one or more implementations of the present disclosure.
Figure 7:
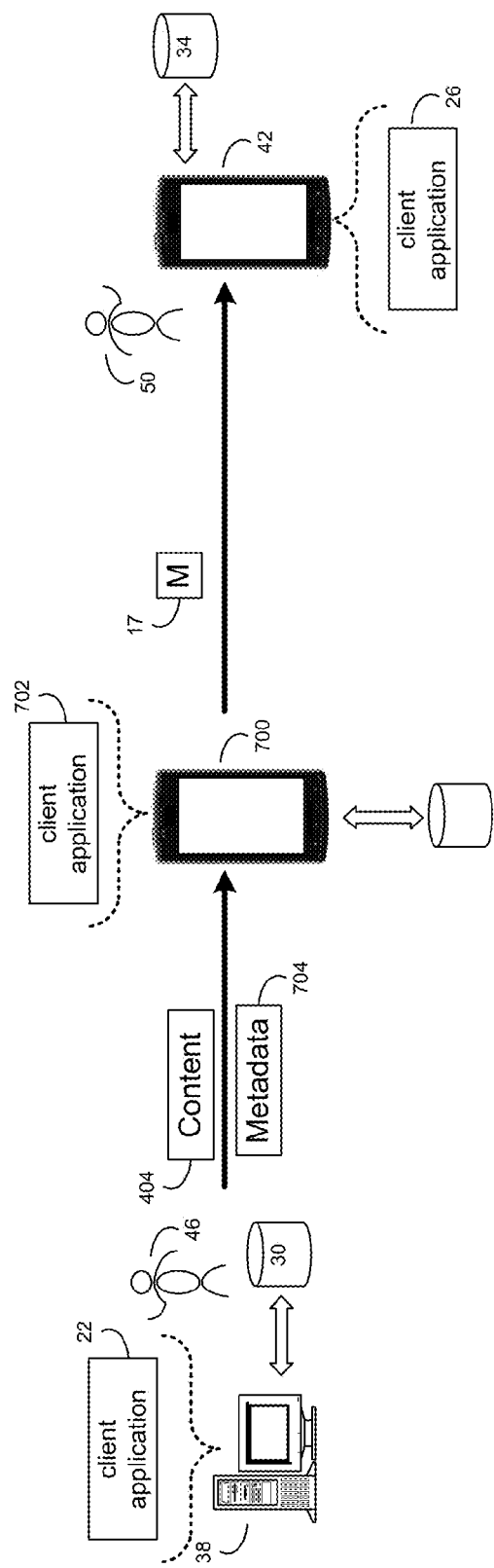
FIG. 7 is an alternative illustrative diagrammatic view of the messaging process coupled to the distributed computing network according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, messaging process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Messaging Process:

As discussed above and referring also to FIGS. 3-7, messaging process 10 may identify 300 content on a computing device. A selection of an intended recipient of an electronic message may be received 302 by messaging process 10. The content may be transmitted 304 by messaging process 10 from the computing device to a first mobile computing device. The content may be transmitted 306 by messaging process 10 from the first mobile computing device to a second mobile computing device via the electronic message.

Assume for example purposes only that a first user (e.g., user 46) may be communicating with a second user (e.g., user 50). In the example, user 46 may be communicating (e.g., via messaging process 10, mobile provider application 20, client application 22, or combination thereof) using client electronic device 38. Further in the example, assume that user 50 may be communicating (e.g., via messaging process 10, mobile provider application 20, client application 26, or combination thereof) with user 46 using client electronic device 42. Even further in the example, and referring at least to FIG. 4, assume that user 46 is utilizing a web browsing application (e.g., provided by client application 22) and has found an interesting article (e.g., article 400) that may be displayed via display 212. Even further in the example, assume that user 46 desires to send at least a portion of the content of article 400 to user 50.

In some implementations, messaging process 10 may identify 300 content on a computing device (e.g., client electronic device 38). For example, user 46 may use, e.g., cursor 402, to select (e.g., "highlight") at least a portion of the content via messaging process 10. In the example, the content (e.g., content 404) highlighted may be identified 300 by messaging process 10. While content 404 is shown to include only text, it will be appreciated that content 404 may include any type of content, including but not limited to text (e.g., captured on a "clipboard"), links (e.g., hyperlinks), and objects (e.g., images, multimedia, etc.). As such, the description of content 404 including text should be taken as an example only and not to limit the scope of this disclosure.

In some implementations, a selection of an intended recipient of an electronic message may be received 302 by messaging process 10. For instance, and continuing with the above example, user 46 may desire to send content 404 to user 50 (and/or a group of users) and may (e.g., via messaging process 10) select user 50 as the recipient of content 404. In the example, the selection of user 50 as the recipient of content 404 may be received 302 by messaging process 10. In some implementations, the selection of the intended recipient of the electronic message may be received 302 via a context menu. For example, and referring at least to FIG. 5, user 46 may use, e.g., pointing device 208 and/or cursor 402, to "right-click" content 404. In the example, right-clicking (or other similar functionality) may cause messaging process 10 (e.g., via a browser plugin of messaging process 10) to render context menu 500. Further in the example, and referring at least to FIG. 6, context menu 500 may include extension context menu 600 that may enable (e.g., via messaging process 10) user 46 to use, e.g., cursor 402, to select user 50 as the indented recipient of the electronic message (e.g., message 17).

In some implementations, the electronic message may include a text message. For example, the text message may include an SMS and/or MMS text message. It will be appreciated that other forms of messaging may be used without departing from the scope of this disclosure. For instance, the electronic message may include, e.g., email.

In some implementations, the content may be transmitted 304 by messaging process 10 from the computing device to a first mobile computing device. For example, and referring at least to FIG. 7, the selected and identified 300 content 404 may be transmitted 304 by messaging process 10 from client electronic device 38 to another client electronic device of user 46 (e.g., mobile computing device 700, which may include but is not limited to a smart phone and/or a data-enabled, cellular telephone). In some implementations, mobile computing device 700 may include client application 702 having similar functionality as any of the above-noted client applications (e.g., client applications 22, 24, 26, 28, 702). Content 404 may be transmitted 304 from client electronic device 38 to mobile computing device 700 using a physical connection (e.g., via an intelligent bridge connection) and/or using wireless connection (e.g., via Near Field Communication (NFC), Bluetooth™, Wi-Fi®, etc.).

In some implementations, the first mobile computing device may be registered 308 by messaging process 10 as a texting agent. For example, messaging process 10 may register 308 mobile computing device 700 as an agent (e.g., a mobile texting agent) with, e.g., client electronic device 38. In some implementations, the first mobile computing device may be registered 308 based upon, at least in part, proximity to the computing device. In some implementations, registering 308 may include one or more of pairing 310 the first mobile computing device with the computing device, and sending 312 one or more of a messaging type capability, one or more potential recipients, and one or more active recipients. For example, if mobile computing device 700 is within a predefined distance of, e.g., 5 feet from client electronic device 38, messaging process 10 may recognize this proximity, intercept the device type to identify whether messaging capabilities are present (e.g., SMS, MMS, Instant Messaging, etc.), and if the device type is capable of messaging, automatically register 308 (e.g., pair 310) mobile computing device 700 with client electronic device 38. Additionally/alternatively, messaging process 10 may also send 312, e.g., a list, of one or more potential recipients of message 17, and/or one or more active recipients (e.g., a recipient that is currently in a conversation, such as an SMS conversation, on mobile computing device 700). In some implementations, if mobile computing device 700 is within a predefined distance of, e.g., 5 feet from client electronic device 38, messaging process 10 may recognize this proximity and render, e.g., a pop-up menu (not shown), enabling user 46 to manually register 308 mobile computing device 700 with client electronic device 38.

As noted above, a selection of an intended recipient of an electronic message may be received 302 by messaging process 10. In some implementations, the selection of the intended recipient of message 17 may be received 302 via an input (not shown) on mobile computing device 700 (e.g., via normal text message addressing techniques).

In some implementations, the above-noted extension context menu 600 may be populated with potential recipients of message 17 from, e.g., the contacts stored in mobile computing device 700. For example, mobile computing device 700 may enable messaging process 10 to access the "address book" of contacts stored in mobile computing device 700, which may then be used to populate extension context menu 600 with potential recipients of message 17. In some implementations, the above-noted contacts and their associated contact information (e.g., names, phone numbers, email addresses, etc.) may be stored at client electronic device 38 (e.g., via storage device 30) to be accessed even when mobile computing device 700 is not connected with client electronic device 38. In the example, when mobile computing device 700 subsequently pairs with client electronic device 38, message 17 may be automatically (or manually via a prompt) transmitted 304 from client electronic device 38 to mobile computing device 700. In some implementations, extension context menu 600 may include an option to search through the above-noted contacts to locate the intended recipient. Additionally/alternatively, messaging process 10 may also transmit to mobile computing device 700 (in addition to content 404) metadata 704 indicating, e.g., what to do with content 404. For instance, the transmission 304 of content 404 may include metadata 704 that may indicate what to do with content 404 (e.g., send via SMS), the above-noted selected intended recipient of message 17, and whether message 17 should be automatically and/or manually transmitted 306. In some implementations, metadata 704 may be transmitted 304 with content 404 or separately.

In some implementations, the content may be transmitted 306 by messaging process 10 from the first mobile computing device to a second mobile computing device via the electronic message. For example, once messaging process 10 has received 302 the selection of the intended recipient of content 404 (e.g., user 50), as well as some or all of the above-noted metadata 704, messaging process 10 may transmit 306 content 404 as a text message from mobile computing device 700 to the mobile computing device of user 50 (e.g., client electronic device 42). In some implementations, message 17 may be generated by messaging process 10 from content 404 at client electronic device 38 before being transmitted from client electronic device 38 to mobile computing device 700. In some implementations, message 17 may be generated by messaging process 10 from content 404 at mobile computing device 700 after receiving content 404 from client electronic device 38. In some implementations, even if mobile computing device 700 is not connected to client electronic device 38, messaging process 10 may still identify 300 content 404, and/or receive 302 the selection of the intended recipient of content 404. For example, once mobile computing device 700 subsequently connects (e.g., pairs) with client electronic device 38, messaging process 10 may retrieve the identified content and selection of intended recipients to automatically (or manually via a prompt) transmit 304 message 17 from client electronic device 38 to mobile computing device 700, and then automatically (or manually via a prompt) transmit 306 message 17 from mobile computing device 700 to the mobile computing device of user 50 (e.g., client electronic device 42).

In some implementations, messaging process 10 need not navigate from client electronic device 38 to computer 12 to facilitated transmission 306 of message 17 to mobile computing device 700. That is, client electronic device 38 may be disconnected from the network (e.g., network 14) and messaging process 10 may still enable message 17 to be transmitted 306 from client electronic device 38 to mobile computing device 700 via the wireless provider network of mobile computing device 700.

In some implementations, the content may be automatically transmitted 306 from the first mobile computing device to the second mobile computing device via the electronic message. For example, once mobile computing device 700 receives content 404, messaging process 10 (e.g., via client application 702) may automatically push and format content 404 into, e.g., a text message addressed at least to user 50, and may transmit 306 the text message to the mobile computing device of user 50 (e.g., client electronic device 42) without any further action required by user 46.

In some implementations, the content may be manually transmitted 306 from the first mobile computing device to the second mobile computing device via the electronic message. For example, once mobile computing device 700 receives content 404, messaging process 10 (e.g., via client application 702) may automatically (or manually) push and format content 404 into, e.g., a text message addressed at least to user 50, and may transmit 306 the text message to the mobile computing device of user 50 (e.g., client electronic device 42) based upon, at least in part, user 46 manually selecting an input on client electronic device 42 that results in the transmission 306 the text message.

While the above-description includes selecting content from a web browsing application, it will be appreciated that content may be selected from other applications (e.g., word processing applications) without departing from the scope of this disclosure. As such, the use of selecting content from a web browsing application should be taken as an example only.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
   identifying content on a computing device including selecting at least a portion of the content on the computing device, wherein the content includes at least one of text saved to a clipboard, a hyperlink, and an object;
   receiving a selection of an intended recipient of an electronic message;
   accessing a contacts list of a first mobile computing device and searching the contacts list for the intended recipient of the electronic message, wherein the intended recipient is associated with a second mobile computing device;
   transmitting the content from the computing device to the first mobile computing device; and
   transmitting metadata from the computing device to the first mobile computing device instructing the first mobile computing device which electronic message medium to use when transmitting the content from the first mobile computing device to the second mobile computing device, and to generate the electronic message with the content per the electronic message medium indicated by the metadata at the first mobile computing device after receiving the content from the computing device.

2. The computer-implemented method of claim 1 further comprising registering the first mobile computing device as a texting agent.

3. The computer-implemented method of claim 2 wherein the first mobile computing device is registered based upon, at least in part, proximity to the computing device, and wherein registering includes one or more of,
   pairing the first mobile computing device with the computing device, and
   sending one or more of a messaging type capability, one or more potential recipients, and one or more active recipients.

4. The computer-implemented method of claim 1 wherein the content is automatically transmitted from the first mobile computing device to the second mobile computing device via the electronic message.

5. The computer-implemented method of claim 1 wherein the content is manually transmitted from the first mobile computing device to the second mobile computing device via the electronic message.

6. The computer-implemented method of claim 1 wherein the selection of the intended recipient of the electronic message is received via a context menu.

7. The computer-implemented method of claim 1 wherein the electronic message includes a text message.

8. A computing system including a processor and a memory configured to perform operations comprising:
   identifying content on a computing device including selecting at least a portion of the content on the computing device, wherein the content includes at least one of text saved to a clipboard, a hyperlink, and an object;
   receiving a selection of an intended recipient of an electronic message;
   accessing a contacts list of a first mobile computing device and searching the contacts list of the first mobile device for the intended recipient of the electronic message, wherein the intended recipient is associated with a second mobile computing device;
   transmitting the content from the computing device to the first mobile computing device; and
   transmitting metadata from the computing device to the first mobile computing device instructing the first mobile computing device which electronic message medium to use when transmitting the content from the first mobile computing device to the second mobile computing device, and to generate the electronic message with the content per the electronic message medium indicated by the metadata at the first mobile computing device after receiving the content from the computing device.

9. The computing system of claim 8 further comprising registering the first mobile computing device as a texting agent.

10. The computing system of claim 9 wherein the first mobile computing device is registered based upon, at least in part, proximity to the computing device, and wherein registering includes one or more of,
- pairing the first mobile computing device with the computing device, and
- sending one or more of a messaging type capability, one or more potential recipients, and one or more active recipients.

11. The computing system of claim 8 wherein the content is automatically transmitted from the first mobile computing device to the second mobile computing device via the electronic message.

12. The computing system of claim 8 wherein the content is manually transmitted from the first mobile computing device to the second mobile computing device via the electronic message.

13. The computing system of claim 8 wherein the selection of the intended recipient of the electronic message is received via a context menu.

14. The computing system of claim 8 wherein the electronic message includes a text message.

15. A computer program product residing on a non-transitory computer readable storage medium having a plurality of instructions stored thereon which, when executed by a processor, cause the processor to perform operations comprising:
- identifying content on a computing device including selecting at least a portion of the content on the computing device, wherein the content includes at least one of text saved to a clipboard, a hyperlink, and an object;
- receiving a selection of an intended recipient of an electronic message;
- accessing a contacts list of a first mobile computing device and searching the contacts list for the intended recipient of the electronic message, wherein the intended recipient is associated with a second mobile computing device;
- transmitting the content from the computing device to the first mobile computing device; and
- transmitting metadata from the computing device to the first mobile computing device instructing the first mobile computing device which electronic message medium to use when transmitting the content from the first mobile computing device to the second mobile computing device, and to generate the electronic message with the content per the electronic message medium indicated by the metadata at the first mobile computing device after receiving the content from the computing device.

16. The computer program product of claim 15 further comprising registering the first mobile computing device as a texting agent.

17. The computer program product of claim 16 wherein the first mobile computing device is registered based upon, at least in part, proximity to the computing device, and wherein registering includes one or more of,
- pairing the first mobile computing device with the computing device, and
- sending one or more of a messaging type capability, one or more potential recipients, and one or more active recipients.

18. The computer program product of claim 15 wherein the content is automatically transmitted from the first mobile computing device to the second mobile computing device via the electronic message.

19. The computer program product of claim 15 wherein the content is manually transmitted from the first mobile computing device to the second mobile computing device via the electronic message.

20. The computer program product of claim 15 wherein the selection of the intended recipient of the electronic message is received via a context menu.

* * * * *